US009842385B2

(12) United States Patent
Atkins

(10) Patent No.: US 9,842,385 B2
(45) Date of Patent: Dec. 12, 2017

(54) DISPLAY MANAGEMENT FOR IMAGES WITH ENHANCED DYNAMIC RANGE

(71) Applicant: DOLBY LABORATORIES LICENSING CORPORATION, San Francisco, CA (US)

(72) Inventor: Robin Atkins, Campbell, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 258 days.

(21) Appl. No.: 14/427,241

(22) PCT Filed: Sep. 9, 2013

(86) PCT No.: PCT/US2013/058683
§ 371 (c)(1),
(2) Date: Mar. 10, 2015

(87) PCT Pub. No.: WO2014/043005
PCT Pub. Date: Mar. 20, 2014

(65) Prior Publication Data
US 2015/0248747 A1    Sep. 3, 2015

Related U.S. Application Data

(60) Provisional application No. 61/700,247, filed on Sep. 12, 2012.

(51) Int. Cl.
*G09G 5/02*     (2006.01)
*G06T 5/00*     (2006.01)
(Continued)

(52) U.S. Cl.
CPC ............... *G06T 5/009* (2013.01); *G06T 5/10* (2013.01); *H04N 5/20* (2013.01);
(Continued)

(58) Field of Classification Search
CPC .................................. G09G 5/02; G06T 5/001
(Continued)

(56) References Cited

U.S. PATENT DOCUMENTS 7,102,697 B2 *   9/2006   Lei ........................ G06T 5/009
                                                              348/678
7,146,059 B1    12/2006   Durand
(Continued)

FOREIGN PATENT DOCUMENTS

EP          0414159        2/1991
WO       2012/012446       1/2012
WO       2013/086169       6/2013

OTHER PUBLICATIONS

Mantiuk, R. et al "Visible Difference Predicator for High Dynamic Range Images" IEEE International Conference on Systems, Man and Cybernetics, Oct. 10-13, 2004, vol. 3, pp. 2763-2769.
(Continued)

*Primary Examiner* — Zhengxi Liu
*Assistant Examiner* — Yi Yang

(57) ABSTRACT

An image processor receives an input image with enhanced dynamic range to be displayed on a target display which has a different dynamic range than a reference display. After optional color transformation (110) and perceptual quantization (115) of the input image, a multiscale mapping process (120) combines linear (125) and non-linear (130) mapping functions to its input to generate first (127) and second (132) output images, wherein the first and second output images may have a different dynamic range than the first image. A frequency transform (135, 140), such as the FFT, is applied to the first and second output images to generate first (137) and second (142) transformed images. An interpolation function (145) is applied to the first and second transformed images to generate an interpolated transformed image (147). An inverse transform function (150) is
(Continued)

applied to the interpolated transformed image to generate an output tone-mapped image (152). The output tone-mapped image is post-processed to be displayed on the target display.

21 Claims, 4 Drawing Sheets

(51) Int. Cl.
 *H04N 5/20* (2006.01)
 *G06T 5/10* (2006.01)

(52) U.S. Cl.
 CPC .............. *G06T 2207/10024* (2013.01); *G06T 2207/20012* (2013.01); *G06T 2207/20016* (2013.01); *G06T 2207/20052* (2013.01); *G06T 2207/20056* (2013.01); *G06T 2207/20208* (2013.01)

(58) Field of Classification Search
 USPC .......................................... 345/589; 382/254
 See application file for complete search history.

(56) References Cited

U.S. PATENT DOCUMENTS

| | | | |
|---|---|---|---|
| 8,081,836 B2 | 12/2011 | Porikli | |
| 2002/0171852 A1* | 11/2002 | Zhang | G06T 5/009 358/1.9 |
| 2007/0274383 A1* | 11/2007 | Yu | G10L 19/24 375/240.11 |
| 2008/0205785 A1 | 8/2008 | Geiger | |
| 2009/0027558 A1* | 1/2009 | Mantiuk | H04N 1/6027 348/673 |
| 2009/0237498 A1* | 9/2009 | Modell | A61B 1/00165 348/65 |
| 2010/0085487 A1* | 4/2010 | Sarkar | H04N 1/6005 348/649 |
| 2010/0303372 A1* | 12/2010 | Zhao | H04N 1/409 382/254 |
| 2011/0064327 A1* | 3/2011 | Dagher | G06T 5/004 382/263 |
| 2011/0206280 A1 | 8/2011 | Lee | |
| 2013/0342557 A1* | 12/2013 | Finlayson | H04N 1/60 345/589 |
| 2014/0002478 A1 | 1/2014 | Ballestad | |

OTHER PUBLICATIONS

Johnson, G.M. et al "Rendering HDR Images" 11th Color Imaging Conference in IS&T/SID, 2003.

Ngo, H. et al "Design of an Efficient Architecture for Real-Time Image Enhancement Based on a Luma-Dependent Nonlinear Approach" IEEE International Conference on Information Technology: Coding and Computing, Apr. 5-7, 2004, pp. 656-660, vol. 1.

Fialka, O. et al "FFT and Convolution Performance in Image Filtering on GPU" IEEE Tenth International Conference on Information Visualization, Jul. 5-7, 2006, pp. 609-614, London, England.

Durand, F. et al "Fast Bilateral Filtering for the Display of High-Dynamic-Range Images" 2002.

Ebner, F. et al. "Development and Testing of a Color Space (IPT) with Improved Hue Uniformity" The Sixth Color Imaging Conference: Color Science, Systems, and Applications, Scottsdale, Arizona, Nov. 1998, pp. 8-13.

Mantiuk, R. et al. "Modeling a Generic Tone-Mapping Operator" Computer Graphics Forum, vol. 27, No. 2, Apr. 1, 2008, pp. 699-708.

Grave, J. et al. "A Tone-Mapping Operator for Road Visibility Experiments" ACM Transactions on Applied Perception, vol. 5, No. 2, May 1, 2008, pp. 1-24.

\* cited by examiner

DISPLAY MANAGEMENT FOR IMAGES WITH ENHANCED DYNAMIC RANGE

CROSS-REFERENCE TO RELATED APPLICATION

This application claims priority to U.S. Provisional Patent Application Ser. No. 61/700,247, filed on Sep. 12, 2012, which is hereby incorporated by reference in its entirety.

TECHNOLOGY

The present invention relates generally to images. More particularly, an embodiment of the present invention relates to the tone and gamut mapping of images with enhanced dynamic range.

BACKGROUND

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or opthamological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is simultaneously perceivable by a HVS. As used herein, EDR may relate to a DR that spans 5 to 6orders of magnitude. Thus while perhaps somewhat narrower in relation to true scene referred HDR, EDR nonetheless represents a wide DR breadth.

In practice, images comprise one or more color components (e.g., luma Y and chroma Cb and Cr) wherein each color component is represented by a precision of N-bits per pixel (e.g., N=8). Images where N≤8 (e.g., color 24-bit JPEG images) are considered images of standard dynamic range, while images where N>8 may be considered images of enhanced dynamic range. EDR and HDR images may also be stored and distributed using high-precision (e.g., 16-bit) floating-point formats, such as the OpenEXR file format developed by Industrial Light and Magic.

Until fairly recently, displays have had a significantly narrower DR than HDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to HDR or EDR.

Most consumer desktop displays support luminance of 200 to 300 cd/m² or nits. Most consumer HDTVs range from 300 to 1000 cd/m². As the availability of EDR content grows due to advances in both capture equipment (e.g., cameras) and EDR displays (e.g., the PRM-4200 professional reference monitor from Dolby), EDR content may be color graded on EDR displays that support more than 2000 nits. As appreciated by the inventors here, improved techniques for the display management of EDR images onto displays with lower dynamic range, are desirable for both backward compatibility and a superior immersive experience.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicate

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Efficient display management (e.g., tone and gamut mapping) of enhanced dynamic range (EDR) images is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the efficient display management of EDR images. An image processor receives an input image with enhanced dynamic range to be displayed on a target display which has a different dynamic range than a reference display. After optional color transformation and perceptual quantization of the input image, a multiscale mapping process applies linear and non-linear mapping functions to its input to generate first and second output images, wherein the first and second output images may have different dynamic ranges and/or brightness than the input image. A frequency transform, such as the FFT, is applied to the first and second output images to generate first and second transformed images. An interpolation function is applied to the first and second transformed images to generate an interpolated transformed image. An inverse transform function, such as the inverse FFT, is applied to the interpolated transformed image to generate an output tone-mapped image. The output tone-mapped image is post-processed to be displayed on the target display. Such post-processing may include inverse perceptual quantization, normalization, saturation boost, color gamut transformation, and color transformation operations.

Example Display Management Processing Pipeline

Figure 1A:
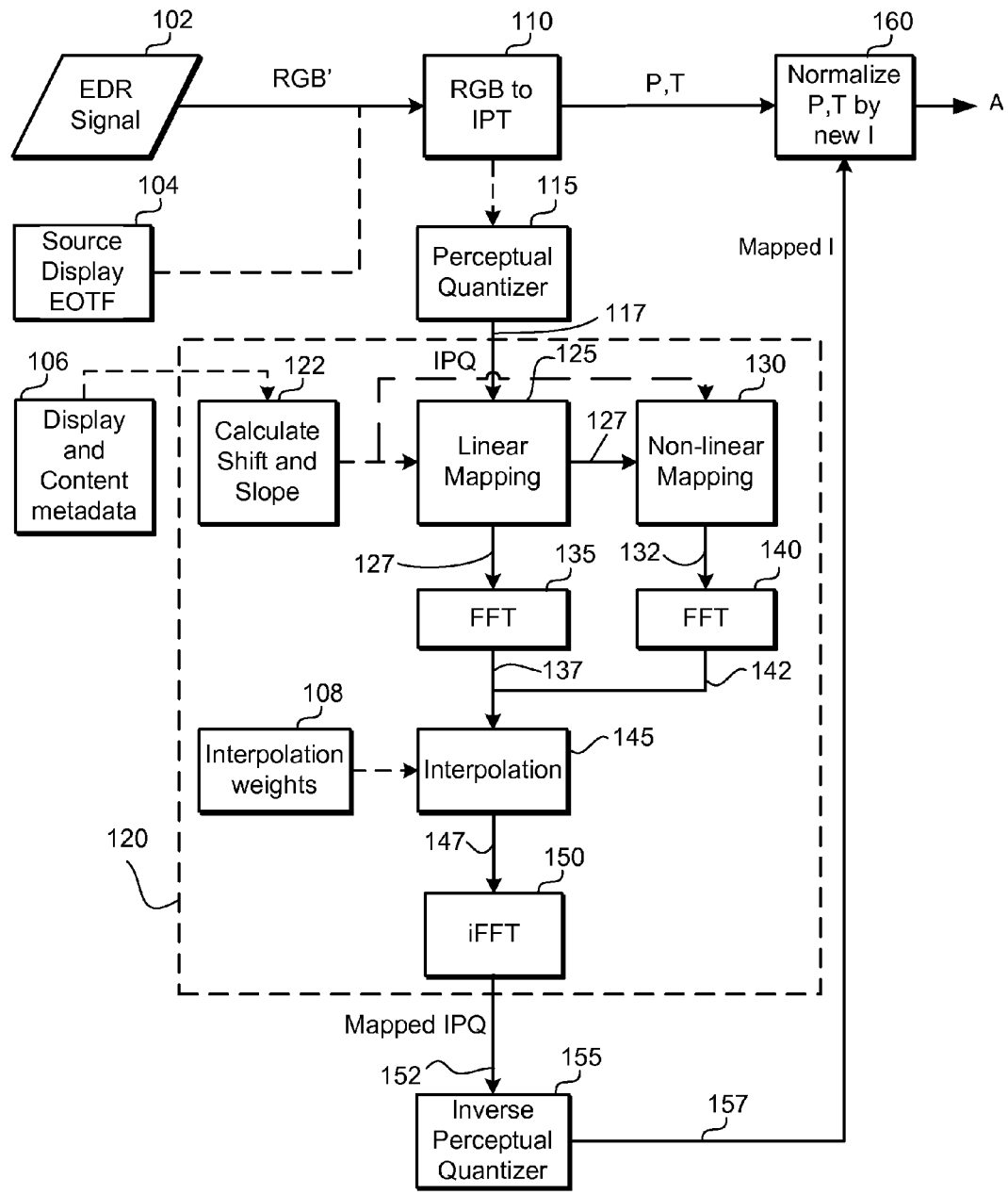
FIG. 1A and FIG. 1B depict an example process for the display management of EDR images according to an embodiment of the present invention.
Figure 1B:
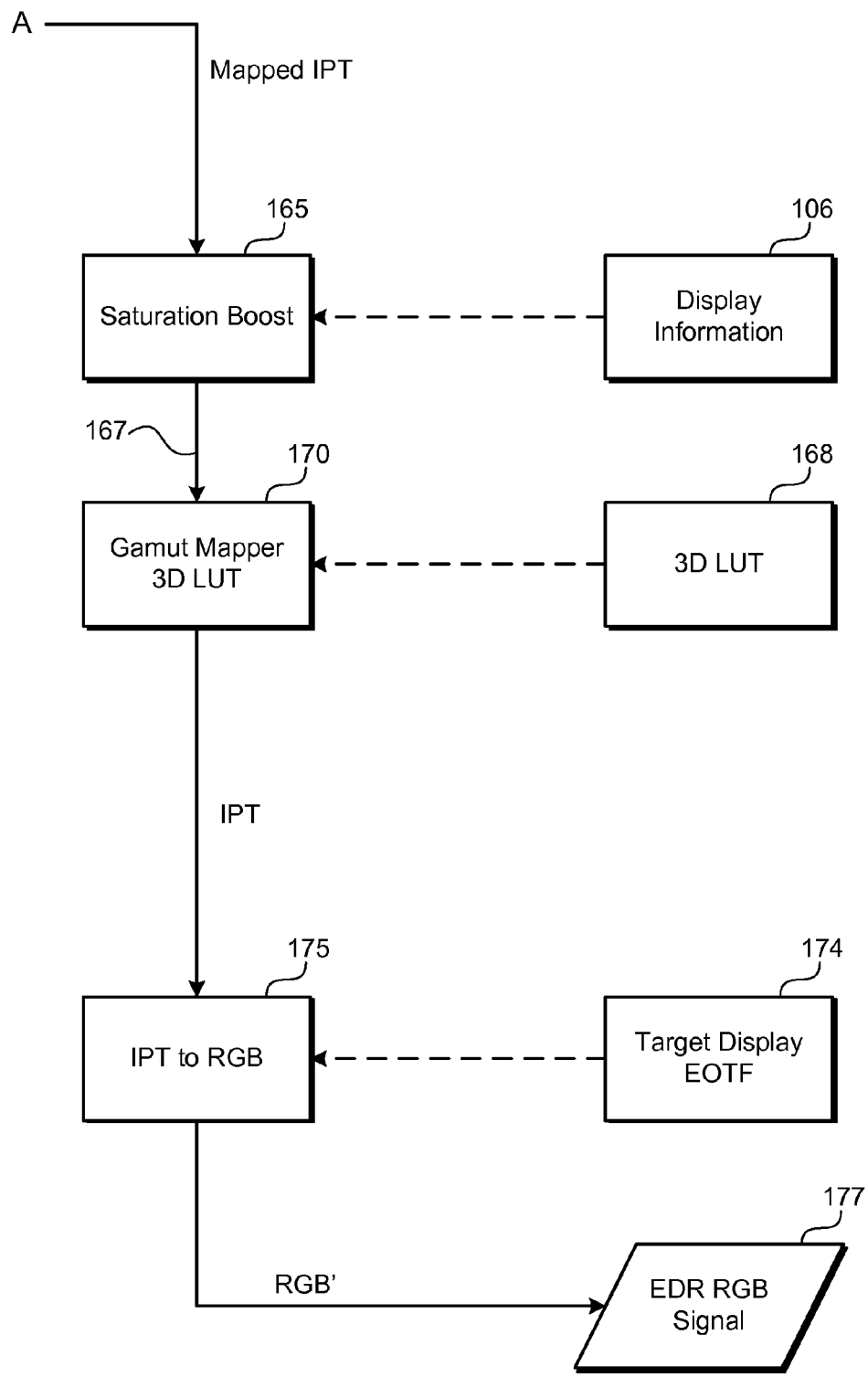

FIG. 1A and FIG. 1B depict an example process for the display management of EDR images according to an embodiment of the present invention. As depicted in FIG. 1A, a video processor (e.g., a set-top box, an image display, or other suitable image processor) receives EDR image 102 and optionally associated metadata 104 and 106. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

The received EDR image 102 may be in an RGB color format or any other color space, such as YCbCr, XYZ, and the like. The received image may have been color graded on a reference EDR monitor which may have different dynamic range and color gamut characteristics than a target display monitor. As used herein, the term "color grading" denotes the process of adjusting the color of an image or video to correct color artifacts and/or to match the director's intend.

EDR input 102 may also include source display metadata 104 related to the display used to color grade the image during program production. For example, such metadata may include the reference electro-optical transfer function (EOTF) as defined by Recommendation ITU-R BT.1866 (03/2011). The EDR input may also include additional source display and content metadata 106, such as the maximum and minimum brightness of the display, the maximum, minimum, and average mid-tone of the data, and the intensity of ambient light during color grading. For example, the metadata for a reference monitor may include the following example parameters used in production:

Monitor Min. brightness, VDRmin=0.02 nits;
Monitor Max. brightness, VDRmax=4000 nits;
Ambient Light, VDRamb=10 nits;
Gamma, VDRgamma=2.4;
Color Space=DCI P3, White Point=D65;

Metadata for the reference monitor need to be transmitted typically only once; however, metadata for the video data may be transmitted on a per-frame basis, on a per-scene basis, or whenever there is a change. If there are no metadata related to the source content, then in some embodiments such data may be extracted by analyzing the source video content.

In a preferred embodiment, the processing pipeline is performed in the IPT color space; however, similar processing steps may be performed in other color spaces, such as RGB, YCbCr, XYZ, CIE-Lab, and the like. IPT, as described in "Development and testing of a color space (ipt) with improved hue uniformity", by F. Ebner and M. D. Fairchild, in Proc. 6$^{th}$ Color Imaging Conference: Color Science, Systems, and Applications, IS&T, Scottsdale, Ariz., November 1998, pp. 8-13, which is incorporated herein by reference in its entirety, is a model of the color difference between cones in the human visual system. In this sense it is like YCbCr or CIE-Lab; however, it has been shown in some scientific studies to better mimic human visual processing than these spaces. Like CIE-Lab, IPT is a normalized space to some reference luminance. In an embodiment, the normalization is based on the maximum luminance of the target display.

As depicted in FIG. 1A, assuming the input EDR signal 102 is in the RGB color space, color space transformation step 110 translates it to the IPT color space. This step may comprise the following steps:

a) Use the EOTF (as provided by metadata 104) to reverse or undo the source display's conversion from code values to luminance (e.g., gamma mapping)

b) Convert the output of step a) to IPT; This step may further comprise the following sub-steps: convert data from an RGB color space to the LMS color space and convert data from the LMS color space to the IPT color space.

After the RGB to IPT color transformation step 110, the "I" component of its output may be processed by an optional perceptual quantization (PQ) step 115. The perceptual quantizer 115 maps linear input gray levels to output gray levels that better match the contrast sensitivity thresholds in the human visual system. Examples of PQ functions are described in the U.S. Provisional applications with Ser. Nos. 61/567,595, filed on Dec. 6, 2011, and Ser. No. 61/674,503, filed on Jul. 23, 2012, both titled "Perceptual luminance nonlinearity-based image data exchange across different display capabilities," by Jon S. Miller et al., both incorporated herein by reference in their entirety.

After perceptual quantization 115, its output 117 is processed by a multiscale interpolation process 120 to output a mapped IPQ signal 152. The purpose of the multiscale interpolation process is to create a tone-mapped image that can be displayed within the parameter constraints of a target display. The target display may be an EDR display or an SDR display. If the target display has the same characteristics as the reference (or source) production display used to process (e.g., color grade) input 102, then no transformation is required; however, if the target display has a dynamic range that is lower or higher than the dynamic range of the reference production display, then this step will map the dynamic range of the input signal to the dynamic range of the target display.

The multiscale interpolation process 120, as depicted in FIG. 1A, comprises multiple processing steps, including a linear tone-mapping step 125, a non-linear tone-mapping step 130, spatial to frequency transforms (135, 140), and weighted interpolation in the frequency domain (145).

Figure 2:
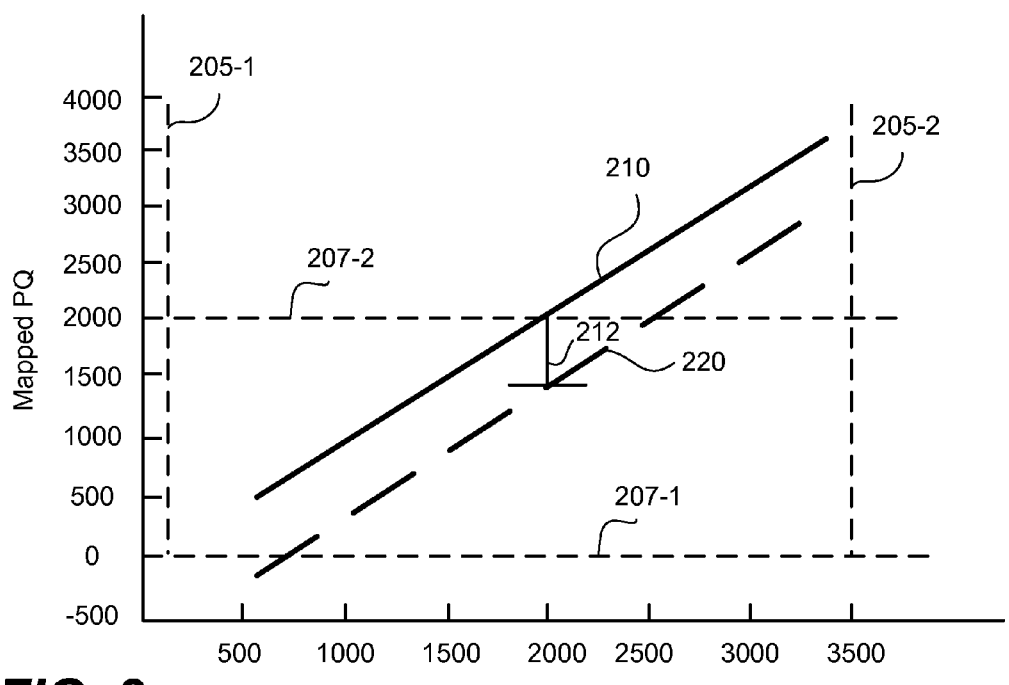
FIG. 2 depicts an example of a linear dynamic range mapping for EDR images according to an embodiment of the present invention.

FIG. 2 depicts an example of a linear mapping process (125) according to an embodiment. In FIG. 2, let boundaries 205-1 and 205-2 depict the minimum and maximum brightness levels of the input signal (EDR PQ) to the mapping process (e.g., 117). Let also 207-1 and 207-2 depict the minimum and maximum brightness levels of the target display. In FIG. 2, as an example, let line 210 depict a linear model of the original mapping of the input EDR PQ signal to a reference 4000 nits display. The signal has a maximum brightness of approximately 3500 nits and needs to be mapped to an output Mapped PQ signal to be displayed on display with a maximum brightness of 2000 nits. Let line 212 depict the desired output mapping for this example.

In an embodiment, the linear mapping process (125) may be expressed as:

$$LinearIPQ = a*EDR\_PQ + d, \qquad (1)$$

where EDR_PQ denotes the input signal (e.g., 117), LinearIPQ denotes the output of the linear mapping (e.g., 127), and parameters a and d are constants that define the linear mapping. As depicted in FIG. 2, d represents a vertical shift (212) of the input signal's brightness (210) towards the desired output brightness (220). Note that after a linear mapping, some pixels of the output signal may still lie outside of the dynamic range supported by the target display.

In an embodiment, d may be computed as $$d = Mid*(1 - S2Tratio), \qquad (2)$$

where Mid denotes the average mid-point brightness of the source content (e.g., 2000 nits) and the S2Tratio value may be defined based on a ratio of target display characteristics over source display characteristics. For example, in an embodiment, $$S2Tratio = \frac{f_{PQ}(Tmin) + f_{PQ}(Tmax) + f_{PQ}(Tamb)}{f_{PQ}(Smin) + f_{PQ}(Smax) + f_{PQ}(Samb)}, \qquad (3)$$

where, $f_{PQ}(\ )$ denotes the perceptual quantization function used in step 115, Tmin, and Tmax, denote the minimum and maximum brightness of the target display, Smin, and Smax, denote the minimum and maximum brightness of the source display, and Tamb and Samb denote the intensity of the ambient light at the target and source displays. Note that if the source and target display have similar characteristics, S2Tratio will be close to 1 and d will be close to zero. In other embodiments, S2Tratio may be computed using weighted averages of the display parameters.

If L2PQ( ) denotes the PQ mapping function ($f_{PQ}(\ )$) in step 115, Table 1 depicts an example implementation of the Linear Mapping step as it may be described in Matlab code.

TABLE 1

% Apply perceptual quantizer to luminance channel
% (e.g., step 115)
VDRIPQ = L2PQ(VDRIPT(:,:,1).^(1/0.43)*VDRmax);
% Compute Shift (e.g., step 122)
% Compute source to target display luminance ratio
S2Tratio = mean([L2PQ(Tmin) L2PQ(Tmax) L2PQ(Tamb)]) /
mean([L2PQ(VDRmin) L2PQ(VDRmax) L2PQ(VDRamb)]);
d = Mid * (1 – S2Tratio);
% Perform 'linear mapping' (e.g., step 125)
LinearIPQ = VDRIPQ-d;

In an embodiment, if after applying offset d, there are still a lot of regions or pixels which are outside of the target range (e.g., too bright or too dim), then scale "a" of equation (1) can be calculated to reduce the amount of out-of-gamut pixels.

As depicted in FIG. 1A, the multiscale process 120 may also comprise a non-linear mapping process 130. The purpose of the non-linear mapping is to roll off the top and bottoms of the input tone curves (e.g., 210 or 212) as needed to further reduce clipping. The non-linear mapping may be applied directly to the output (117) of the perceptual quantizer (115), or it may be applied to the output (127) of the linear mapping (125). If it is applied to the output of the linear mapping, the linear mapping step may skip adjusting the slope a of equation (1) and simply set a=1, as shown in Table 1.

Figure 3:
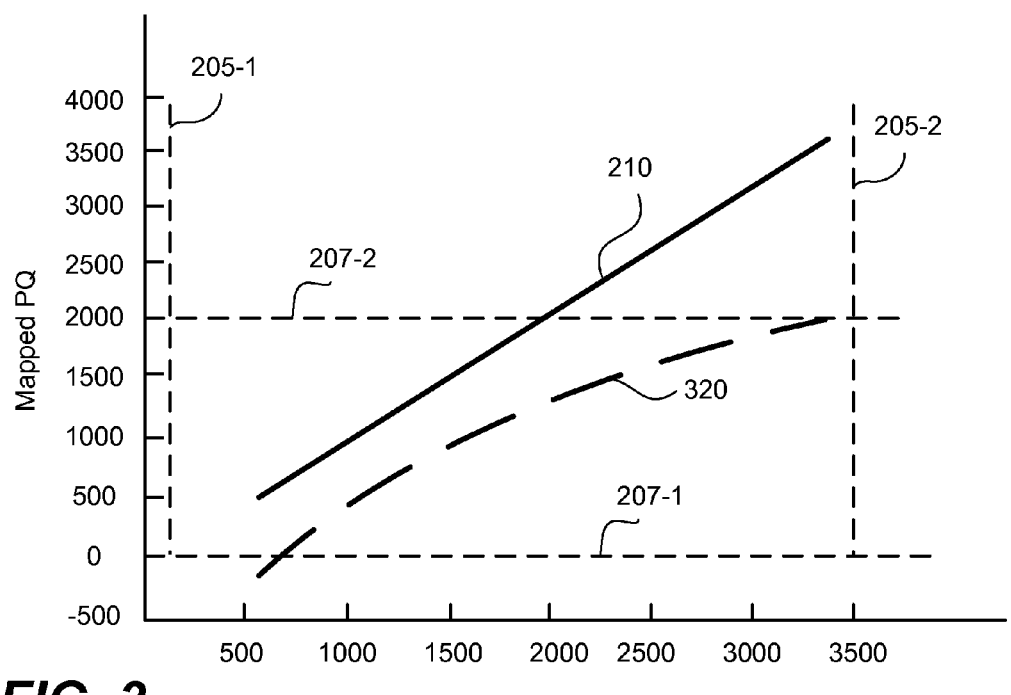
FIG. 3 depicts an example of a non-linear dynamic range mapping for EDR images according to an embodiment of the present invention.

FIG. 3 depicts an example embodiment of a non-linear mapping according to an embodiment. Assuming an input to reference display dynamic range mapping 210, as depicted in FIG. 3, the output of the non-linear mapping (e.g., 320) fits better within the dynamic range constraints (e.g., 207-1 and 207-2) of the target display. An example non-linear mapping transform is described by A. Ballestad et al., in PCT application with Ser. No. PCT/US2012/029189, filed on Mar. 15, 2012, titled "Method and apparatus for image data transformation," which is incorporated herein by reference in its entirety.

According to the Ballestad '189 PCT application, an example transfer function for non-linear mapping may be denoted as $$Y_{out} = \frac{c_1 + c_2 Y_{in}^n}{1 + c_3 Y_{in}^n}, \qquad (4)$$

where $C_1$, $C_2$, and $C_3$ are constants, $Y_{in}$ is the input value for a color channel (e.g., the I channel), $Y_{out}$ is the output value for the color channel, and n is a parameter. This transfer function is an example of a parameterized sigmoidal tone curve function. Parameters $C_1$, $C_2$, and $C_3$ are determined based on the brightness characteristics of the reference display, which are typically extracted from input metadata 106, and the brightness characteristics of the target display, which are typically already known to the processor performing the display management process.

Table 2 depicts an example implementation of the Non-Linear Mapping step 125 as it may be described in Matlab code.

TABLE 2

% Map with non-linear curve
Max = max(L2PQ(Tmax),Clip-d);
Min = min(L2PQ(Tmin),Crush-d);
[c1, c2, c3] = ADMparams(Min, Mid-d, Max, L2PQ(Tmin), Mid-d, L2PQ(Tmax), 1);
ADMIPQ = (c1+c2*LinearIPQ)./(1+c3*LinearIPQ); %n=1

In Table 2, function ADMIPQ( ) is based on equation (4), where constants $C_1$, $C_2$, and $C_3$ are computed by the function ADMparams( ) based on the methods described in the Ballestad '189 PCT application. LinearIPQ corresponds to $Y_{in}$ and represents the output 127 of the linear mapping process. The parameters Clip, Crush, and Mid are examples of parameters that can be used in the process. In an embodiment, Clip denotes the brightest white value in a scene, Mid denotes the average gray level for a scene, and Crush denotes the darkest black level in the scene. The values of these parameters may either be computed based on the input video stream or they may be part of the input metadata (106). In an embodiment, these parameters are calculated on a per scene bases. Scene cuts may be determined manually, or they may also be part of the input metadata. For example, an array of Cuts may define the frame numbers of scene cuts. Alternatively, a parameter in each frame may define whether the frame represents the beginning of a scene cut.

As depicted in Table 2, in this example, the free parameter n in equation (4) may be set to n=1 to preserve the mid-tones slope. In other embodiments, n may be set equal to a, the slope parameter of equation (1), or some other value.

The linear (125) and non-linear (130) mapping operations may be applied to a whole input frame. Such operations are commonly referred to as global tone-mapping operators (TMOs). They may succeed in mapping the input dynamic range into the target dynamic range; however, they may be unable to preserve some of the contrast details in the original image. To improve upon the operation of these global TMOs, multiscale interpolation 120 comprises an additional interpolation processing step 145.

As depicted in FIG. 1A, the outputs of the linear mapping (125) and the non-linear mapping (130) operations are processed each by a fast Fourier Transform (FFT) process (e.g., steps 135 and 140) to transform the two images in the frequency domain. Then, given an array of interpolation weights (108), the two images are blended together in the frequency domain to form an interpolated transformed image (147). In an example embodiment, the interpolation is linear; however, non-linear interpolation techniques may also be applied.

Some embodiments may apply spatial to frequency domain transform functions other than the FFT (e.g., a Discrete Cosine Transform (DCT) or a Discrete Sine Transform (DST), and the like). In some embodiments, additional execution processing speed may be achieved by using hardware accelerators to compute these transforms. In some embodiments, the transforms may be computed in parallel using multiple processors or computational threads.

In some embodiments, before applying the FFT or any other transform function one may remove any letterbox areas or sidebars, and or/pad the borders of the images by replicating or mirroring pixels nears the edge of the image. Such padding may be needed if the horizontal or vertical dimensions of the image are not powers of two. After applying the inverse transform, one may remove any padding that was added and/or restore the letterbox or sidebar areas.

Figure 4:
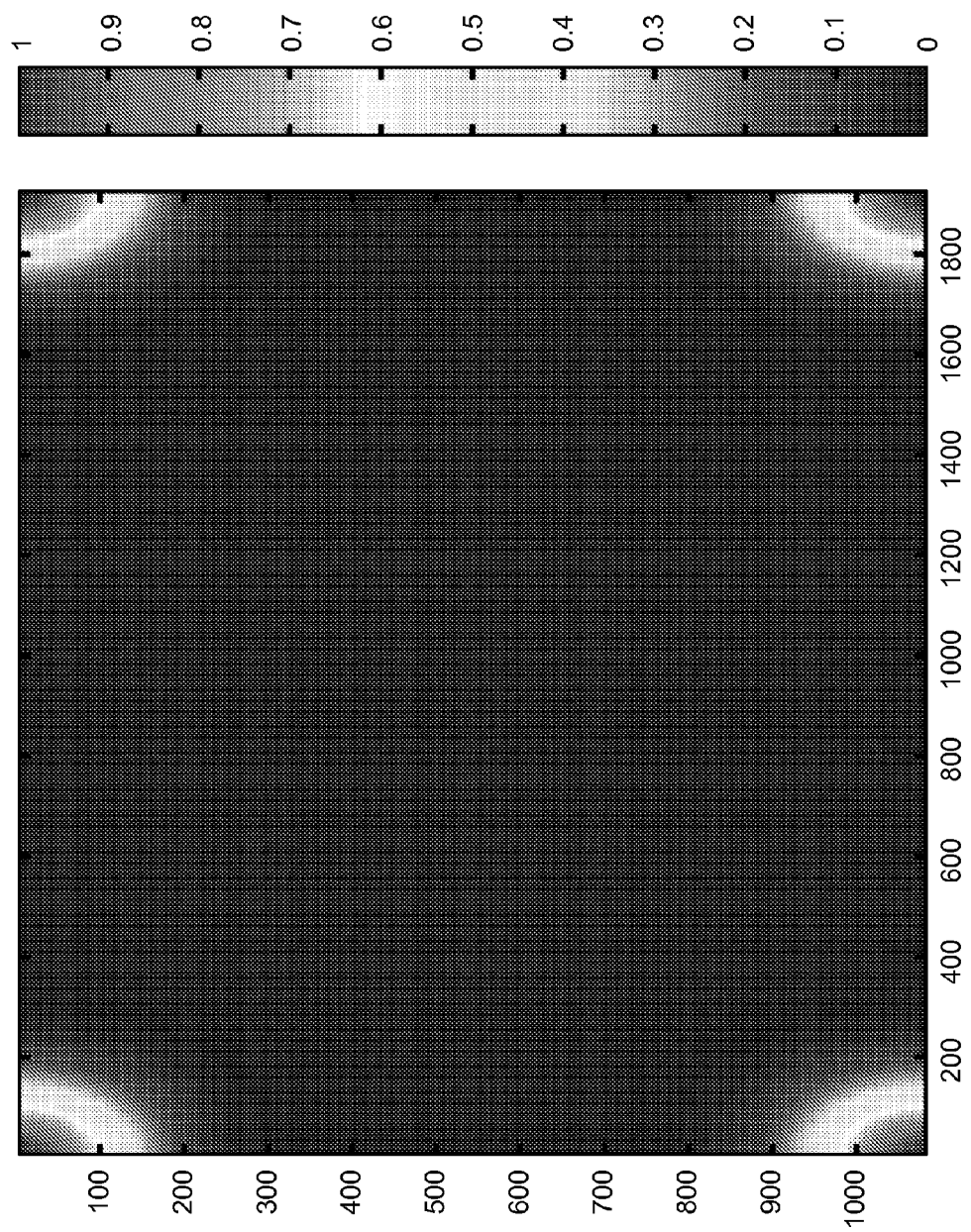
FIG. 4 depicts an example set of interpolation coefficients for multiscale interpolation of EDR images according to an embodiment of the present invention.

FIG. 4 depicts an example array of interpolation weights for the interpolation step 145, as computed for 1920×1080 image. In an example embodiment, the weights may represent the coefficients of a Gaussian filter. As depicted in FIG. 4, weight values at the edges (higher frequencies) are higher than weights in the middle (low frequencies). Given weights $w_{ij}$ and $g_{ij}$, the output (147) of the interpolation process 145 may be denoted as $$Fms_{ij} = w_{ij} Fl_{ij} + g_{ij} Fnl_{ij}, \quad (5)$$

where $Fl_{ij}$ denotes the FFT output of the liner mapping (137) process and $Fnl_{ij}$ denotes the FFT output of the non-linear mapping process (142).

In an embodiment where $w_{ij} + g_{ij} = 1$, equation (5) may be expressed using a single set of normalized weights $\alpha_{ij}$ (e.g., $0 \leq \alpha_{ij} \leq 1$) as $$Fms_{ij} = \alpha_{ij} Fl_{ij} + (1 - \alpha_{ij}) Fnl_{ij}. \quad (6)$$

For the example weights depicted in FIG. 4, in an embodiment, low frequencies are selected to be closer to the non-linear mapping while high frequencies are selected to be closer to the linear mapping.

After the interpolation step 145, the multiscale interpolation process concludes by performing an inverse FFT (iFFT) (150) to the output of the interpolation process (145), so the display management process may return back into operating in the spatial domain. The output (Mapped IPQ 152) of the iFFT represents the final tone mapped image of the I component. Note that after the weighted merging of the two tone-mapping curves, some pixels may still be outside of the dynamic range for the target display.

Table 3 depicts an example of the interpolation processing steps 135, 140, 145, and 150, as they may be described in Matlab code.

TABLE 3

% Compute multiscale blending weights for a 1920x1080 image
% using a Gaussian 1920x1080 filter and standard deviation = 100.
alpha = lpfilter('gaussian', 1080, 1920, 100);
% Blend the two mappings in the frequency domain
Fadm = fft2(ADMIPQ); % step 140
Flinear = fft2(LinearIPQ); % step 135
Fms = alpha .* Fadm + (1−alpha) .* Flinear; % step 145
MappedIPQ = ifft2(Fms); % step 150

P and T are just relative intensities of the color differences compared to the intensity I. Since the multiscale interpolation process 120 has modified the I color component, the P and T color components need to be adjusted to preserve hue and saturation.

First, in step 155, assuming a perceptually quantization step (115) was applied, the perceptually encoded gray levels are transformed back to linear gray using an inverse Perceptual Quantizer function. In an embodiment, the P and T components are scaled by the same ratio. That is, if I' represents the value for the Mapped I component (157), then P' and T', the mapped P and T components may be derived as:

$$P' = (P*I')/I, \text{ and}$$

$$T' = (T*I')/I. \quad (7)$$

Table 4 depicts an example implementation of steps 155 and 160, as they may be described in Matlab code.

TABLE 4

% Convert back to linear space and normalize P and T by Mapped I.
% Apply inverse PQ (step 155)
MappedIPT(:,:,1) = (PQ2L(MappedIPQ)/Tmax).^(0.43);
% Normalize P and T
MappedIPT(:,:,2) = VDRIPT(:,:,2) .* MappedIPT(:,:,1) ./ VDRIPT(:,:,1);
MappedIPT(:,:,3) = VDRIPT(:,:,3) .* MappedIPT(:,:,1) ./ VDRIPT(:,:,1);

Following the normalization of the P and T color components in step 160, the display management process may continue as depicted in FIG. 1B. Since luminance (I) has been decreased, in some embodiments saturation needs to be increased to compensate and to preserve colorfulness (step 165). In an embodiment, the amount of saturation increase is based on the amount of luminance decrease (e.g., the S2Tratio computed in equation (3) based on metadata 106). In other embodiments, the saturation increase may depend also on intensity or even hue. In an embodiment, the P and T components are increased by the same ratio (e.g., by $1/S2Tratio^{0.43}$). Note that if the target display matches the characteristics of the reference display (e.g., S2Tratio≈1), then the saturation boost step may be skipped.

Table 5 depicts an example implementation of the saturation boost step 165, as it may be described in Matlab code.

TABLE 5

% Increase saturation to account for reduced luminance
MappedIPT(:,:,2) = max(−1,min(1, MappedIPT(:,:,2) ./ S2Tratio.^0.43));
MappedIPT(:,:,3) = max(−1,min(1, MappedIPT(:,:,3) ./ S2Tratio.^0.43));

The tone mapping and saturation boost processing steps may result in colors outside of the target display gamut. A 3D color gamut look up table (LUT) (168) may be computed and applied to the video signal 167 to adjust the color gamut. After color gamut correction (170), the signal may be transformed back to the RGB color space (step 175), and may be gamma corrected to generate the final EDR RGB signal (177) for display on the target display and/or other post-processing.

In some embodiments, the multiscale interpolation process (120) may be further simplified by integrating the liner mapping process (125) into the interpolation process (145). For example, by applying the FFT to both sides of equation (1)

$$Fl_{ij}=aFedr_{ij}+d\delta_{ij}, \quad (8)$$

where $Fedr_{ij}$ denotes the FFT of the EDR_PQ signal (e.g., 117) and $\delta_{ij}=1$ if i=0 and j=0 and 0 for all other values of i and j. In other words, the offset d affects only the DC component of the $Fl_{ij}$ output (e.g., $Fl_{00}$). By combining equations (5) and (8), the interpolation process of equation (8) can be rewritten as $$Fms_{ij}=w_{ij}aFedr_{ij}+g_{ij}Fnl_{ij}+w_{ij}d\delta_{ij}. \quad (9)$$

Hence, the scaling (a) and offset (d) parameters of the linear mapping step (125) may be combined with the interpolation weights ($w_{ij}$) of the interpolation step (145) for improved computational efficiency. In an embodiment, during the weighted interpolation process, one may want to ignore the DC component of $Fedr_{ij}$ but still take into consideration the offset d. Then, equation (8) may be expressed as $$Fms_{ij} = \begin{cases} g_{00}Fnl_{00} + w_{00}d, & \text{for } i = 0 \text{ and } j = 0 \\ w_{ij}aFedr_{ij} + g_{ij}Fnl_{ij}, & \text{otherwise} \end{cases} \quad (10)$$

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the display management, and display of images with enhanced dynamic range, such as those described herein. The computer and/or IC may compute any of a variety of parameters or values that relate to the display management processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to the display management of EDR images as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient display management of EDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method performed on an image processing system which includes a processor and a memory for tone mapping an input image, the input image having an enhanced dynamic range higher than a standard dynamic range of a target display, the method comprising:

applying, using the image processing system, a linear tone mapping function to the input image to determine a first output image;

applying, using the image processing system, a non-linear tone mapping function to the first output image to determine a second output image;

applying, using the image processing system, a spatial-to-frequency transform function to the first output image to determine a first transformed image;

applying, using the image processing system, the spatial-to-frequency transform function to the second output image to determine a second transformed image;

blending, using the image processing system, the first and the second transformed images together in the frequency domain by applying a weighted interpolation function to the first and the second transformed images to generate an interpolated transformed image, wherein the first and the second transformed images are derived from the input image; and applying, using the image processing system, an inverse frequency transform function to the interpolated transformed image to determine an output tone-mapped image to be displayed on the target display.

2. The method of claim 1, wherein the second output image is generated by applying a non-linear mapping function to the first image.

3. A method for the display management of images, the method comprising:
accessing an input image;
applying a perceptual quantizer (PQ) function to the input image to generate a PQ image, wherein the PQ function maps gray levels of the input image from a linear domain to a non-linear domain; and
processing the PQ image according to the method of claim 1 to generate a mapped PQ image.

4. The method of claim 3 further comprising: applying an inverse PQ function to the mapped PQ image to generate a tone-mapped version of the input image.

5. The method of claim 4, further comprising:
scaling chroma components of pixel values in the input image by a normalization scale factor to generate a normalized image, the normalization scale factor comprising a ratio of corresponding pixel luminance values of the tone-mapped version of the input image over luminance values of the input image.

6. The method of claim 5, further comprising: applying a saturation boost function to the normalized image to generate a saturation-boosted tone-mapped image.

7. The method of claim 3, wherein the input image is in the IPT color space.

8. The method of claim 1, wherein the first output image is computed by adding a shift value to the first image, the shift value computed in response to characteristics of a source display and characteristics of a target display.

9. The method of claim 8 wherein the characteristics of the source display comprise a minimum brightness value and a maximum brightness value for the source display.

10. The method of claim 8, wherein the characteristics of the target display comprise a minimum brightness value and a maximum brightness value for the target display.

11. The method of claim 8, wherein the characteristics of the source display are accessed through received metadata.

12. The method of claim 1, wherein the non-linear mapping function is expressed as a parameterized sigmoidal tone curve function, wherein parameters of the function are determined based on characteristics of a source display and a target display.

13. The method of claim 12, wherein the sigmoidal tone function is expressed as $$Y_{out} = \frac{c_1 + c_2 Y_{in}^n}{1 + c_3 Y_{in}^n},$$

wherein $C_1$, $C_2$, and $C_3$ are constants, n is a free parameter, and for an input $Y_{in}$, $Y_{out}$ is a corresponding output value.

14. The method of claim 1, wherein the spatial to frequency transform function comprises a fast Fourier transform (FFT) and the inverse frequency transform function comprises an inverse FFT.

15. The method of claim 1, wherein an output of the interpolation function comprises a product of a value of the first transformed image multiplied by a fist weight coefficient, the product added to a corresponding value of the second transformed image scaled by a second weight coefficient.

16. The method of claim 15, wherein the first weight coefficient and the second weight coefficient add to 1.

17. The method of claim 1, where the first dynamic range is an enhanced dynamic range.

18. The method of claim 1 wherein the first output image has lower brightness than the first image.

19. The method of claim 1, wherein the second output image has lower dynamic range than the first image.

20. An apparatus comprising:
a memory and a processor coupled to the memory, wherein the processor is configured to perform tone mapping for an input image, the input image having an enhanced dynamic range higher than a standard dynamic range of a target display, wherein the processor is configured to apply a linear tone mapping function to the input image to determine a first output image; wherein the processor is configured to apply a non-linear tone mapping function to the first output image to determine a second output image; wherein the processor is configured to apply a spatial-to-frequency transform function to the first output image to determine a first transformed image; wherein the processor is configured to apply the spatial-to-frequency transform function to the second output image to determine a second transformed image; wherein the processor is configured to blend the first and the second transformed images together in the frequency domain by applying a weighted interpolation function to the first and the second transformed images to generate an interpolated transformed image, wherein the first and the second transformed images are derived from the input image; and wherein the processor is configured to apply an inverse frequency transform function to the interpolated transformed image to determine an output tone-mapped image to be displayed on the target display.

21. A non-transitory computer-readable storage medium having stored thereon computer-executable instructions for causing an image processing system, which includes a processor and memory, to execute a method for tone mapping an input image, the input image having an enhanced dynamic range higher than a standard dynamic range of a target display, the method comprising:
applying a linear tone mapping function to the input image to determine a first output image;
applying a non-linear tone mapping function to the first output image to determine a second output image;
applying a spatial-to-frequency transform function to the first output image to determine a first transformed image;
applying the spatial-to-frequency transform function to the second output image to determine a second transformed image;
blending the first and the second transformed images together in the frequency domain by applying a weighted interpolation function to the first and the second transformed images to generate an interpolated transformed image, wherein the first and the second transformed images are derived from the input image; and
applying an inverse frequency transform function to the interpolated transformed image to determine an output tone-mapped image to be displayed on the target display.

* * * * *